(12) United States Patent
Anderson et al.

(10) Patent No.: US 11,420,344 B2
(45) Date of Patent: Aug. 23, 2022

(54) SMOOTH SURFACED FLEXIBLE AND STRETCHABLE SKIN FOR COVERING ROBOTIC ARMS IN RESTAURANT AND FOOD PREPARATION APPLICATIONS

(71) Applicants: Robert Anderson, Pasadena, CA (US); David Zito, Pasadena, CA (US); Grant Stafford, Pasadena, CA (US); William Werst, Pasadena, CA (US); Dev Kumar, Pasadena, CA (US)

(72) Inventors: Robert Anderson, Pasadena, CA (US); David Zito, Pasadena, CA (US); Grant Stafford, Pasadena, CA (US); William Werst, Pasadena, CA (US); Dev Kumar, Pasadena, CA (US)

(73) Assignee: Miso Robotics, Inc., Pasadena, CA (US)

(*) Notice: Subject to any disclaimer, the term of this patent is extended or adjusted under 35 U.S.C. 154(b) by 155 days.

(21) Appl. No.: 16/392,539

(22) Filed: Apr. 23, 2019

(65) Prior Publication Data

US 2019/0321989 A1    Oct. 24, 2019

Related U.S. Application Data

(60) Provisional application No. 62/662,120, filed on Apr. 24, 2018.

(51) Int. Cl.
*B25J 19/00* (2006.01)
*B25J 11/00* (2006.01)
*B08B 1/00* (2006.01)
*B08B 17/04* (2006.01)
*B08B 9/023* (2006.01)
(Continued)

(52) U.S. Cl.
CPC .......... *B25J 19/0075* (2013.01); *B08B 1/006* (2013.01); *B08B 9/023* (2013.01); *B08B 17/04* (2013.01); *B25J 11/0045* (2013.01); *B32B 1/08* (2013.01); *B32B 7/02* (2013.01); *B32B 27/08* (2013.01); *B32B 2307/51* (2013.01); *B32B 2307/746* (2013.01); *B32B 2571/00* (2013.01)

(58) Field of Classification Search
None
See application file for complete search history.

(56) References Cited

U.S. PATENT DOCUMENTS 4,181,163 A * 1/1980 Schulein ............... B02C 18/305
141/381
4,904,514 A  2/1990 Morrison et al.
(Continued)

FOREIGN PATENT DOCUMENTS

EP  2198719 A2 * 6/2010 ............ B25J 9/0093

OTHER PUBLICATIONS

English Machine Translation of EP 2198719 A2.*

*Primary Examiner* — Nicole Blan
(74) *Attorney, Agent, or Firm* — Richard Batt

(57) ABSTRACT

A sleeve apparatus for protecting a robotic kitchen arm from contamination. The sleeve includes a proximal end, a distal end, a passageway extending from the proximal end to the distal end, and an exterior surface. The passageway has an effective diameter less than the effective diameter of the robotic kitchen arm such that the exterior surface of the sleeve apparatus is substantially fold-free when the robotic arm is in the extended configuration. Methods of cleaning a robotic kitchen arm are also described.

14 Claims, 6 Drawing Sheets

(51) Int. Cl.
    *B32B 1/08*         (2006.01)
    *B32B 7/02*         (2019.01)
    *B32B 27/08*       (2006.01)

(56) References Cited

U.S. PATENT DOCUMENTS

| | | |
|---|---|---|
| D313,674 S | 1/1991 | Sharpe |
| 5,184,601 A | 2/1993 | Putman |
| D366,349 S | 1/1996 | Barney |
| 5,522,791 A | 6/1996 | Leyva |
| 5,592,953 A * | 1/1997 | Delao .................. A61F 15/004 128/882 |
| D393,138 S | 4/1998 | Frey |
| D442,765 S | 5/2001 | Newman |
| D445,864 S | 7/2001 | McLoughlin |
| 6,346,150 B1 * | 2/2002 | Conlin ............... B05B 13/0431 118/323 |
| D560,041 S | 1/2008 | Cook et al. |
| 7,727,244 B2 | 6/2010 | Orban et al. |
| D632,874 S | 2/2011 | Stephanis et al. |
| D636,180 S | 4/2011 | Sayre |
| 7,947,050 B2 | 5/2011 | Lee et al. |
| D746,997 S | 1/2016 | Higgins |
| D774,280 S | 12/2016 | Hakeem |
| D777,288 S | 1/2017 | Scott |
| D778,506 S | 2/2017 | Matfus et al. |
| 9,743,987 B2 | 8/2017 | Farritor et al. |
| D824,977 S | 8/2018 | Everman |
| 10,105,727 B2 | 10/2018 | D'Andreta |
| 2008/0103461 A1 | 5/2008 | Johnson et al. |
| 2008/0237921 A1 * | 10/2008 | Butterworth ............ B05B 15/50 264/241 |
| 2008/0299163 A1 * | 12/2008 | Haskin ................... A01N 25/34 424/411 |
| 2009/0072563 A1 | 3/2009 | Phillips |
| 2012/0055595 A1 * | 3/2012 | Schodowski ........ B25J 19/0075 150/154 |
| 2012/0297516 A1 | 11/2012 | Elliot |
| 2014/0200494 A1 * | 7/2014 | Winkler, Sr. ........... A61H 1/008 601/84 |
| 2014/0216334 A1 * | 8/2014 | D'Andreta .............. B05B 15/50 118/504 |
| 2016/0375590 A1 * | 12/2016 | Lessing ................... B25J 15/12 294/196 |
| 2017/0334084 A1 | 11/2017 | Hogg |
| 2018/0092797 A1 * | 4/2018 | Uzzo ................... A61H 9/0078 |
| 2019/0321989 A1 | 10/2019 | Anderson et al. |
| 2020/0086509 A1 | 3/2020 | Johnson et al. |

* cited by examiner

SMOOTH SURFACED FLEXIBLE AND STRETCHABLE SKIN FOR COVERING ROBOTIC ARMS IN RESTAURANT AND FOOD PREPARATION APPLICATIONS

CROSS-REFERENCE TO RELATED APPLICATIONS

This application claims the benefit of U.S. Provisional Application No. 62/662,120, entitled "Smooth surfaced flexible and stretchable skin for covering robotic arms in restaurant and food preparation applications", and filed Apr. 24, 2018, the entire contents of which is incorporated by reference.

BACKGROUND

This relates to food preparation equipment, and more particularly to automated kitchen apparatus for manipulating food items.

Automating food preparation is desirable to increase efficiency, increase accuracy, and to reduce cost. To this end, robotic kitchen assistants (RKA) have been employed to manage the food preparation in commercial and restaurant kitchen environments. Using a robotic kitchen automation tool, the robotic arm performs a range of food preparation tasks such as, for example, placing food items onto a grill surface; flipping food items on a grill surface; removing food items from a grill surface; and cleaning the grill surface. Examples of RKAs and particular tasks performed by the RKAs are described in the following patent applications, each of which is incorporated by reference in their entirety: PCT Patent Application No: PCT/US18/21066, entitled "ROBOTIC KITCHEN ASSISTANT FOR PREPARING FOOD ITEMS IN A COMMERCIAL KITCHEN AND RELATED METHODS", filed Mar. 6, 2018; PCT Patent Application No: PCT/US18/20948, entitled "AUGMENTED REALITY-ENHANCED FOOD PREPARATION SYSTEM AND RELATED METHODS", filed Mar. 5, 2018; and Provisional No. 62/592,130, entitled "AN INFRARED-BASED AUTOMATED KITCHEN ASSISTANT SYSTEM FOR RECOGNIZING AND PREPARING FOOD AND RELATED METHODS", filed Nov. 29, 2017".

Despite the above, a challenge for robotic applications in the food handling and restaurant industries is cleanliness. Cleanliness of surfaces is critical for preventing contamination of food items. The challenge arises because it is not uncommon for food particles and liquids to be deposited on the surface of the robot arm during food preparation processes. These particles and liquids may contain bacteria or other illness causing substances or they may create deposits where such substances can collect and grow.

In restaurant and other food service environments, such as the ones in which the robotic kitchen assistant operates, the cleaning requirements are especially important because the methods that may be employed to clean various types of kitchen equipment are often very limited as compared to those available to the industrial environments in which robots typically operate. Specifically, and by way of example, in industrial environments, high pressure water and high pressure water that also contains cleaning compounds such as detergents, biocides, and abrasives, may be pressure-sprayed onto equipment to clean. Such high-pressure streams remove materials and substances even from recessed areas of equipment, such as those that are typically present at rotating joints. Furthermore, by carefully selecting the composition of a final spray, such streams are able to effectively remove and flush out any biocides and cleaning agents used during the cleaning process.

In contrast, such methods are not employed, either because they are not practical or are specifically forbidden by regulation, in the restaurant and food service environments. In the restaurant and food service environments, a "wipe down" approach is often employed, in which water or a cleaning agent is applied to a cleaning cloth or sponge and then used to wipe the surface of the item to be cleaned. Alternatively, the item to be cleaned may be sprayed directly with the water or cleaning agent at low pressure, typically from a hand-operated spray bottle, and then wiped. The resulting wiping action and, in some cases, the direct low pressure spray, have a limited ability to reach and remove materials and substances that may be present in any folds or recesses that may be present in items to be cleaned.

Further, a wipe down is not able to remove chemical residues as completely as a high pressure spray down, which limits the strength of the cleaning agents and biocides that can be employed, as these agents must be removed prior to using the equipment in food preparation applications. As a result, robotic arms employed in restaurant or food service applications, where only wipe down cleaning is available, cannot effectively be cleaned.

In addition to ensuring the robotic arm can be cleaned effectively, it is also important to prevent contamination of food items by substances that might be emitted from the robot arm and become incorporated into food items. Such substances include lubrication oils and metallic particles. These substances could be harmful if ingested by humans.

Examples of coverings and sleeves are described in prior patents including U.S. Pat. No. 5,184,601 to Putman; U.S. Pat. No. 5,522,791 to Leyva; U.S. Pat. No. 7,727,244 to Orban et al.; U.S. Pat. No. 7,947,050 to Lee et al.; and U.S. Pat. No. 9,743,987 to Farritor; as well as U.S. Patent Publication No. 20170334084 to Hogg, each of which is incorporated by reference in its entirety.

Notwithstanding the above, it is still desirable to overcome the challenges and shortcomings described above.

SUMMARY OF THE INVENTION

Embodiments of the invention are directed to a skin or sleeve sized to cover a robotic arm to enable safe handling and preparation of food items in a restaurant or food service environment.

In embodiments, a sleeve apparatus for protecting a robotic kitchen arm from contamination includes a body comprising a proximal end, a distal end, a passageway extending from the proximal end to the distal end, and an exterior surface. The passageway has an effective diameter less than the effective diameter of the robotic kitchen arm such that (a) the exterior surface of the sleeve apparatus is substantially fold-free when the robotic arm is in the extended configuration, and (b) the exterior surface of the sleeve apparatus comprises at least one fold when the robotic kitchen arm is in the bent configuration.

In embodiments, the body comprises a first layer, and a second layer covering the first layer, and the second layer is made of a liquid-proof elastic polymer.

In embodiments, the first layer has a greater thickness and is less elastic than the second layer.

In embodiments, the exterior surface has a surface roughness less than or equal to 250 µin.

In embodiments, the body has a modulus of elasticity of less than 100 kPa.

In embodiments, the passageway has a total length ranging from 36 to 70 inches, and an effective diameter in the range from 3-12 inches.

In embodiments, the exterior surface comprises a biocide coating.

In embodiments, the sleeve apparatus further comprises the robotic kitchen arm.

In embodiments, the body is formed of at least two tubular sections, and adjacent tubular sections overlap.

In embodiments, the effective diameter of the robotic kitchen arm varies along its length and the effective diameter of the passageway varies along its length to accommodate the varying effective diameter of the robotic kitchen arm.

In embodiments, an undersized ratio of the effective diameter of the passageway to the effective diameter of the robotic kitchen arm at any point along the length of the robotic kitchen arm ranges from 0.5%-3%.

In embodiments, the robotic kitchen arm and sleeve include at least two joints.

In embodiments, the sleeve apparatus further includes a compression element at the proximal end of the body.

In embodiments, a method of cleaning a robotic kitchen arm comprises enclosing the robotic kitchen arm with a sleeve; manipulating the sleeve into a target configuration for cleaning while the sleeve encloses the robotic kitchen arm, the target configuration being fold-less along the exterior surface; and wiping down the exterior surface of the sleeve while the sleeve is enclosing the robotic kitchen arm.

In embodiments, the method further comprises preparing food using the robotic kitchen arm prior to the step of manipulating, and wherein the step of preparing food comprises articulating the robotic kitchen arm into at least one bent configuration such that at least one fold arises along a portion of the sleeve.

In embodiments, the step of manipulating is performed by straightening the robotic kitchen arm subsequent to the step of preparing the food until the at least one fold is eliminated.

In embodiments, the passageway comprises an effective diameter less than an outer diameter of the robotic kitchen arm, such that the sleeve is stretched while enclosing the robotic kitchen arm.

In embodiments, a sleeve apparatus for protecting a robotic kitchen arm from contamination comprises a body comprising a proximal end, a distal end, a passageway extending from the proximal end to the distal end, and an exterior surface. The body has a sizing such that the passageway has an effective diameter equal to or less than the effective diameter of the robotic kitchen arm.

In embodiments, the body is formed of at least two tubular sections wherein adjacent tubular sections overlap.

In embodiments, the sleeve apparatus has an effective diameter such that the exterior surface is entirely fold-free along its length when the robotic arm is in an extended or straightened configuration.

In embodiments, the skin is sized relative to the robotic kitchen arm such that tension is present in at least one area of the skin. In embodiments, the skin is sized such that tension is present in at least the majority of the skin material. In embodiments, the skin is sized such that tension is present in at least one direction in all areas of the skin.

The description, objects and advantages of embodiments of the present invention will become apparent from the detailed description to follow, together with the accompanying drawings.

BRIEF DESCRIPTION OF THE DRAWINGS

The above-mentioned aspects, as well as other features, aspects and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise.

DETAILED DESCRIPTION

Figure 1A:
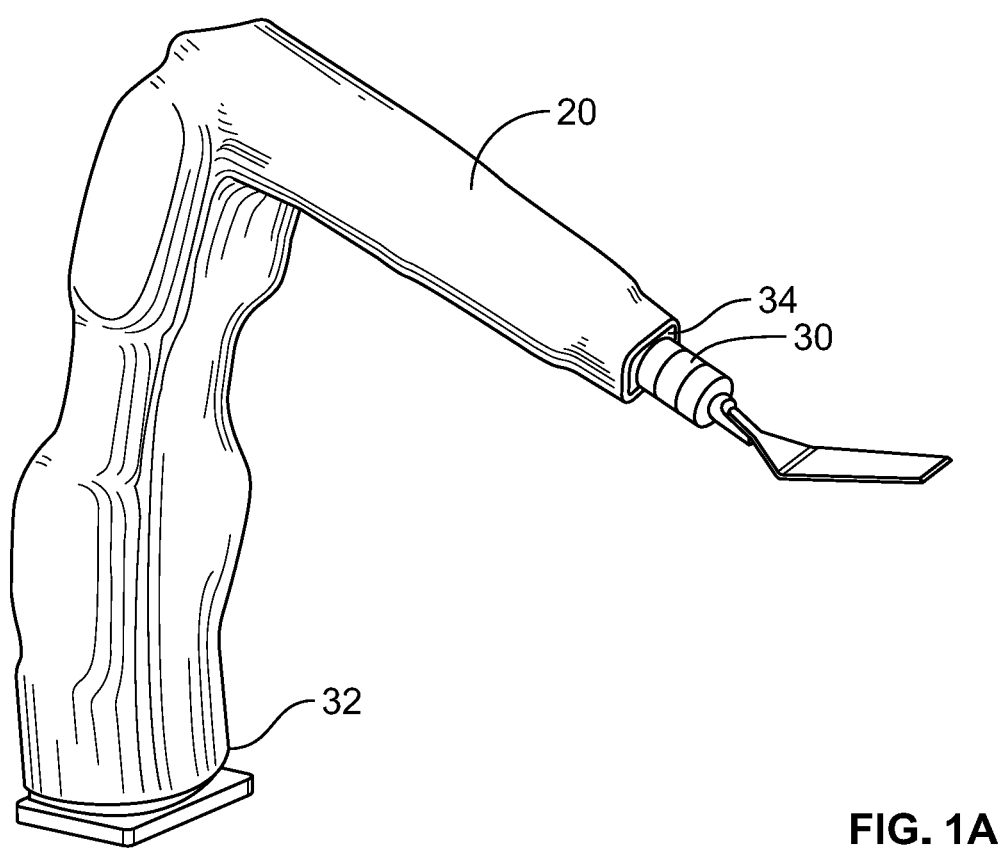
FIG. 1A is perspective view of a robotic kitchen arm enclosed in a skin in a bent orientation in accordance with an embodiment of the invention.

It is to be understood that the embodiments of the invention described herein are not limited to particular variations set forth herein as various changes or modifications may be made to the embodiments of the invention described and equivalents may be substituted without departing from the spirit and scope of the embodiments of the invention. As will be apparent to those of skill in the art upon reading this disclosure, each of the individual embodiments described and illustrated herein has discrete components and features that may be readily separated from or combined with the features of any of the other several embodiments without departing from the scope or spirit of the embodiments of the present invention. In addition, many modifications may be made to adapt a particular situation, material, composition of matter, process, process act(s) or step(s) to the objective(s), spirit or scope of the embodiments of the present invention. All such modifications are intended to be within the scope of the claims made herein.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will also be understood that, although the terms first, second, etc. may be used herein to describe various elements, these elements should not be limited by these terms. These terms are only used to distinguish one element from another. Thus, a first element could be termed a second element without departing from the teachings of the present invention.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

All existing subject matter mentioned herein (e.g., publications, patents, patent applications and hardware) is incorporated by reference herein in its entirety except insofar as the subject matter may conflict with that of the present invention (in which case what is present herein shall prevail).

The following patents and applications are incorporated by reference in their entirety: PCT Publication No. 2018165105, entitled "ROBOTIC KITCHEN ASSISTANT FOR PREPARING FOOD ITEMS IN A COMMERCIAL KITCHEN AND RELATED METHODS", filed Mar. 6, 2018; PCT Publication No. 2018165038, entitled "AUGMENTED REALITY-ENHANCED FOOD PREPARATION SYSTEM AND RELATED METHODS", filed Mar. 5, 2018; US Publication No. 20180345485, entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", filed Aug. 10, 2018.

FIG. 1A illustrates a skin or sleeve 20 covering a robotic kitchen arm 30 in a bent, operative, or contracted configuration. The sleeve is preferably flexible, stretchable, form-fitting, and smooth-surfaced. As described herein, sleeve 20 provides an exterior surface that can be effectively cleaned using a traditional restaurant "wipe down" process.

The composition of the skin 20 may vary. In embodiments, the skin is comprised of a food safe material as defined in specifications offered by regulatory bodies such as the Food & Drug Administration (FDA). Examples of materials include, without limitation, silicone, neoprene, natural or synthetic rubbers, polyurethane rubber, Buna-N rubber, thermoplastic rubber, polyurethane, silicone rubber, silicone coated polyester, vinyl, coated polyester, and latex.

In a preferred embodiment, the skin is fabricated from a smooth-surfaced neoprene film, such as the 5 mm neoprene manufactured by Macro International (Irvine, Calif.). In another embodiment, the skin is made from other materials or combinations of other materials. In embodiments, the skin materials are cast from a mold directly into the desired skin shape, thereby eliminating the need for stitching which, as mentioned above, should not be exposed directly in food preparation applications. An example of a desired skin shape for casting is the extended arm configuration shown in FIG. 1B.

The texture of the skin 20 may vary. In embodiments, the surface roughness of the skin is sufficiently low, serving to prevent food-related materials to attach themselves to the surface. In one embodiment, the surface roughness is less than 250 μin.

The size of the skin 20 may vary. In embodiments, the skin is sized such that its material is completely or predominately in tension after it is applied to the robot arm at at least one configuration/orientation in the robot arm's range of motion (e.g., the extended configuration shown in FIG. 1B). Without intending to being bound to theory, such tension ensures that the cover is smooth and without folds (or wrinkles) at at least one configuration in the robot's arm range of motion to ensure that the cover can be easily wiped down with a cleaning cloth to remove foreign materials and substances.

In embodiments, the inner dimensions of the cover are smaller than the corresponding outer dimension or effective diameter of the robotic kitchen arm. The degree that the cover is smaller than the robotic arm can be expressed as an undersized ratio. In embodiments, the undersized ratio ranges from 0.1% to 10%, preferably, 0.5%-3%, or 1-3% depending on the material that the skin is manufactured from. For a relatively more elastic material, the undersize ratio is larger.

It is also contemplated that the effective diameter of the robotic kitchen arm (as well as cross sectional shape) changes along the length of the robotic arm, and in embodiments of the invention, the diameter (and cross sectional shape) of the skin matches (or is less than) the cross sectional profile of the robotic kitchen arm in accordance with the ratios and dimensions described herein.

An example of a robotic arm for use with the sleeve described herein is the LR MATE 200iD/7LC manufactured by FANUC America Corporation (Rochester Hills, Mich.). It includes a payload of 7 kg, 6 axes, and a reach of 911 mm. Additional non-limiting examples of robotic arms and corresponding descriptions of the robotic arms for use with the subject invention can be found at: www.fanucamerica.com. However, the above referenced robotic arm, and specifications are only exemplary in nature, and the sleeve may be utilized and sized as described herein to protect a wide variety of other robotic arms. Other robot products and arms can be obtained from various manufacturers such as, for example, Kuka, Fanuc, Universal Robots, ABB, and Panasonic.

The elasticity of the skin 20 may vary. In embodiments, the modulus of elasticity of the skin is sufficiently low such that it does not interfere with operation of the robotic arm. In embodiments, the modulus of elasticity of the skin is less than 100 kPa.

The skin may be fabricated in various manners. In a preferred embodiment, the skin is fabricated from a mold of the robotic kitchen arm while in an extended configuration.

However, the invention is not so limited. In other embodiments, the skin is fabricated from sheets of neoprene that have been stitched together to form a close-fitting cover for the robot arm. The stitched form is then turned inside out and the outer joints welded or glued together. In this way, the stitching with its intricate surface and many recesses that could collect food particles, are not exposed to the food preparation environment.

Figure 1B:
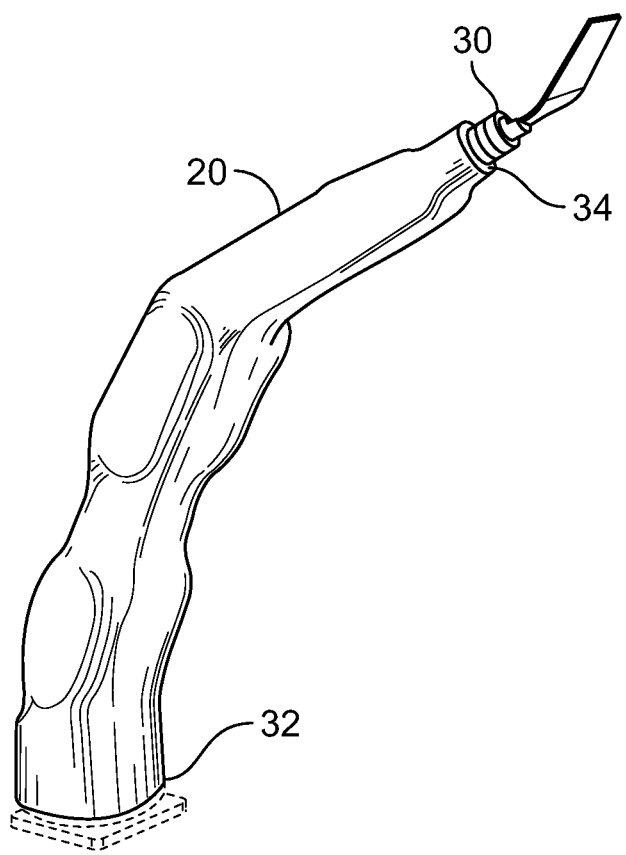
FIG. 1B is a perspective view of the robotic kitchen arm and skin shown in an extended orientation in accordance with an embodiment of the invention.
Figure 2A:
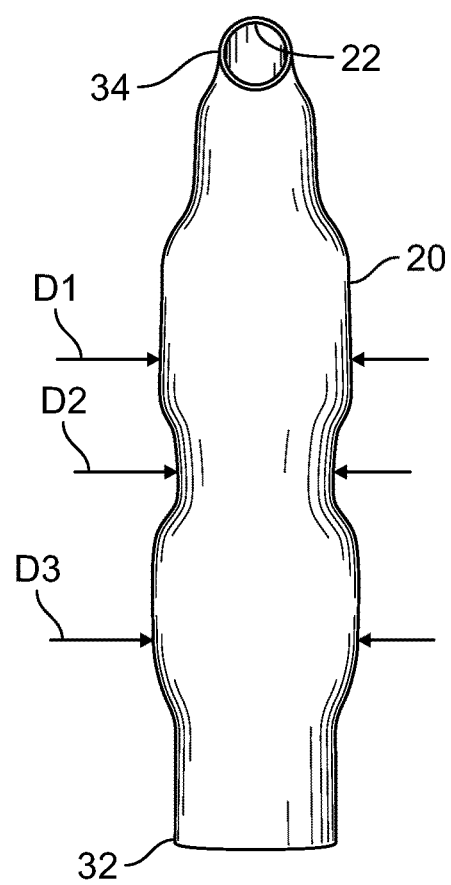
FIG. 2A is a front view of a robotic arm skin shown in an extended position.
Figure 2B:
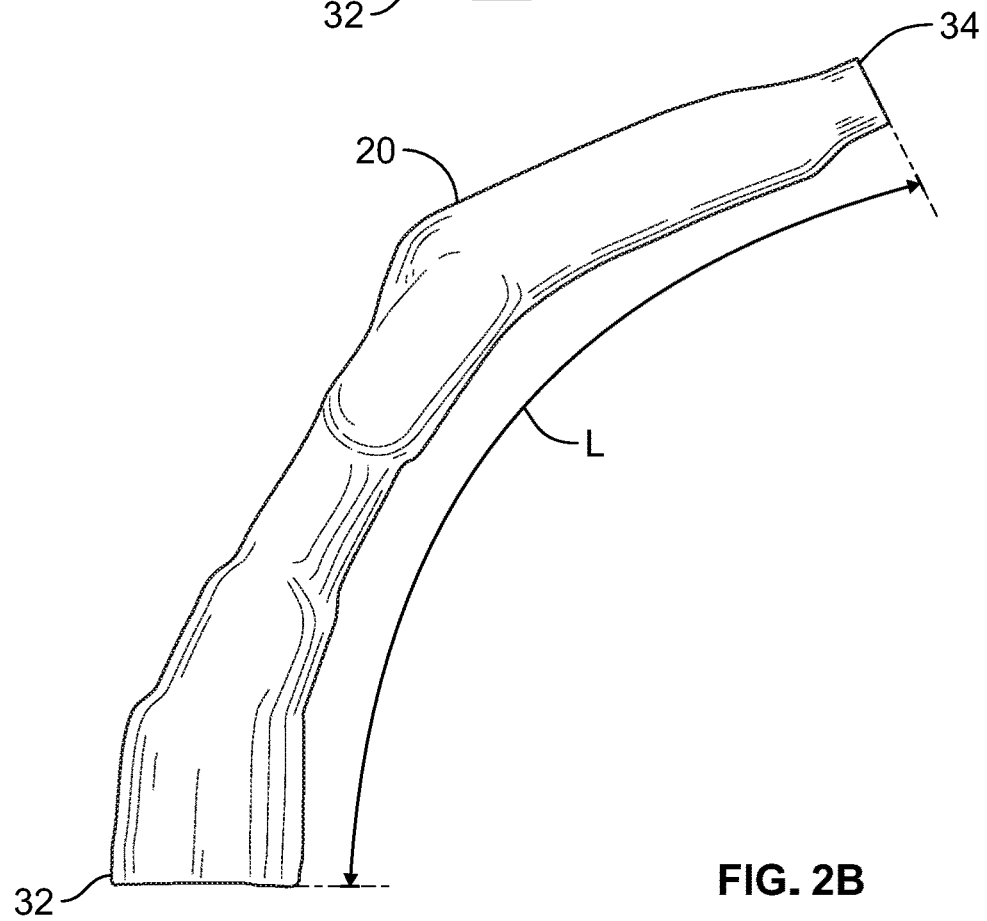
FIG. 2B is a first side view of the robotic arm skin shown in FIG. 2A.
Figure 2C:
FIG. 2C is a top view of the robotic arm skin shown in FIG. 2A.
Figure 2D:
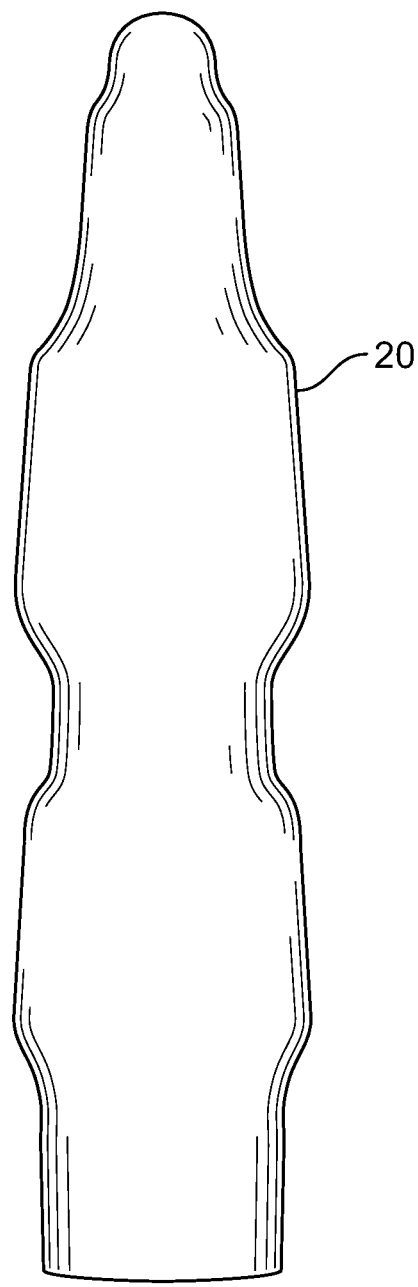
FIG. 2D is a rear view of the robotic arm skin shown in FIG. 2A.

FIG. 1B illustrates the skin 20 covering the robotic arm 30 in a second or extended configuration in which there are no folds visible in the skin. Such a position would be used for cleaning (e.g., a wiping down) the skin covered robotic arm as described herein. In embodiments, the skin is clamped to the surface of the robotic arm on both ends 32, 34.

FIGS. 2A-2D illustrate the various engineering views of the skin 20 in an extended configuration with the robotic kitchen arm removed for clarity. Skin 20 is shown having an opening 22 at a distal end 34 for an end effector of a robotic arm (not shown) to extend therefrom. The outer profile or cross section of the skin (or characteristic diameter) is shown varying along its length (L) from the proximal end 32 to the distal end 34.

In embodiments, the diameters (D1, D3) at the arm joints range from 4 to 12 in., more preferably from 8 to 10 in., and in one embodiment D1 and D3 are both 9 in.

In embodiments, the diameter (D2) outside the arm joints ranges from 3 to 8 in., more preferably from 5 to 7 in., and in one embodiment D2 is 6 in.

In embodiments, the wall thickness of the skin ranges from 3 to 7 mm.

In embodiments, the total length (L) of the skin ranges from 36 to 70 in., more preferably from 50 to 60 in., and in one embodiment is 54 in.

Figure 3:
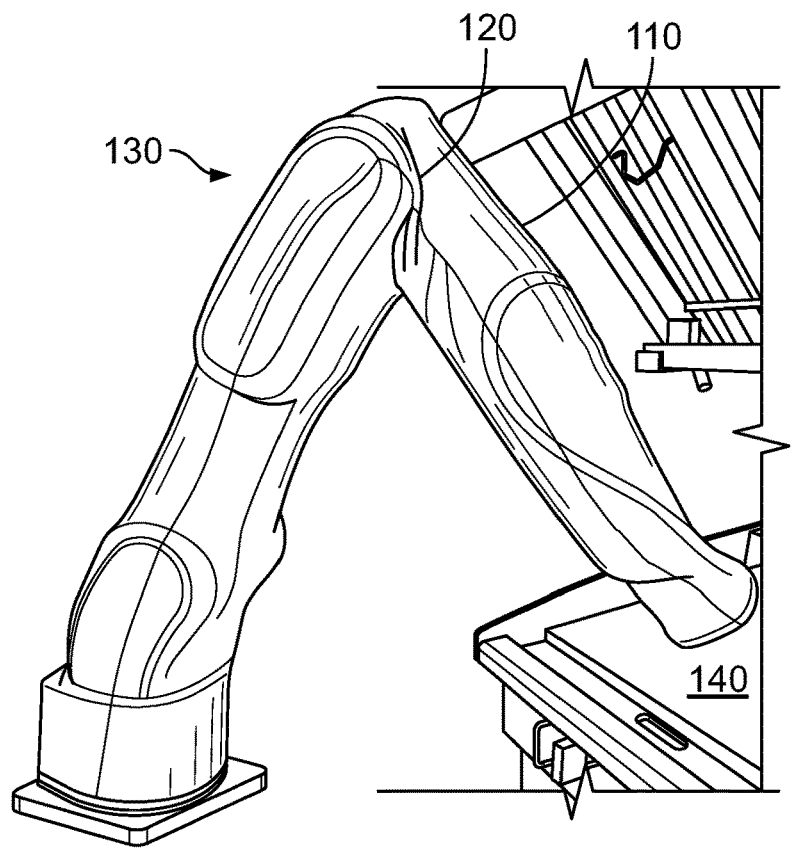
FIG. 3 is a perspective view of another robotic kitchen arm and sleeve shown in a bent configuration.
Figure 4:
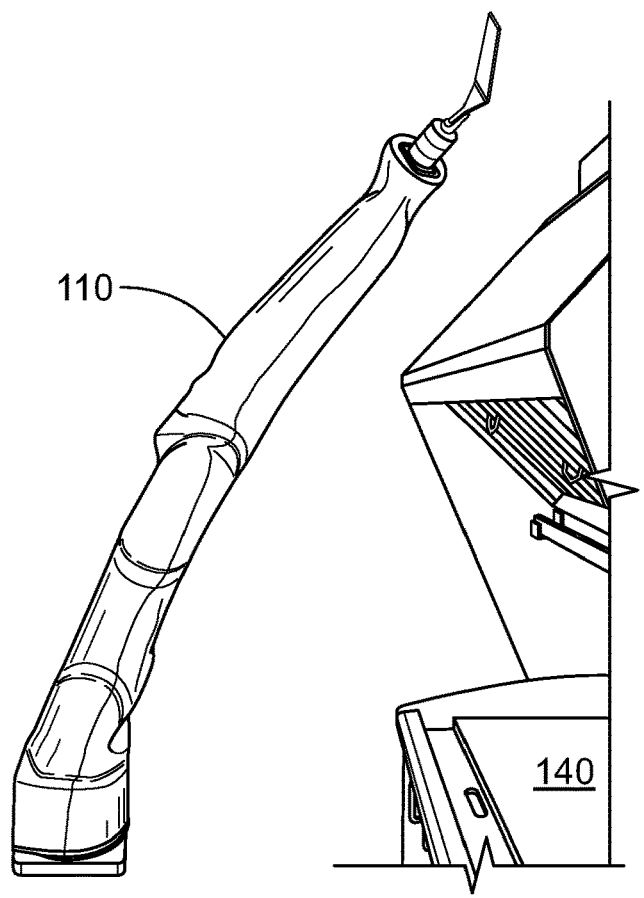
FIG. 4 is a perspective view of another robotic kitchen arm and sleeve shown in an extended configuration.

FIG. 3 illustrates a skin 110 covering a robotic arm (not visible) in an operative bent configuration. The skin 110 and robotic kitchen arm are shown in close proximity to the grill 140 and generally in an exemplary position for carrying out food preparation tasks.

Also shown in FIG. 3 are marked folds 120 at the joint 130. Notably, with reference to FIG. 4, folds 120 are not present at the extended arm orientation shown in FIGS. 1B, and 2A-2D, and FIG. 4. As stated previously, folds prevent the skin from being cleaned by a wipe down technique. However, in accordance with embodiments of the present invention, the skin 110 is sized and sufficiently elastic such that it is fold-free when the robotic arm is manipulated to the extended configuration as shown in, for example, FIG. 4. Consequently, the skin 110 can be effectively cleaned when the robotic kitchen arm is placed in a configuration as shown in FIGS. 1B, 2A-2D, and 4.

ALTERNATE EMBODIMENTS

Though the invention has been described above having particular features, the invention can include alternative embodiments.

For example, in one alternative embodiment, portions of the skin are not be in tension and may contain folds. The skin is sized such that it does not have any folds over a first portion of its surface at a first configuration, but does have folds at a second portion at this first configuration. At a second configuration, however, the skin does not have any folds at the second portion but has folds in the first portion. Further, in embodiments, the skin may be sized such that there is at least one point/configuration in the operating range of the robotic arm where there are no folds on a given portion or area of the skin. The skin covered robot arm can be cleaned by moving it to a first position, cleaning a first portion that has no folds, and then moving to a second position, cleaning a second portion that now has no folds, and so on. In embodiments, the arm may be programmed to automatically move to such points and signal for an employee to clean its surface (or a part thereof) as part of an automated cleaning process.

In embodiments, the skin is tightly fitted to the robot arm at both ends to prevent any foreign materials from entering or leaving the volume between the skin and the robot arm. In embodiments, both ends of the skin are secured to the robotic arm using compression fittings. In embodiments, air is pumped into the interface between the skin and arm to help remove any folds and ensure effective cleaning. The air is removed after the cleaning process is complete.

In embodiments, the skin is an articulated exoskeleton that is fitted over the robot arm. Joints of the exoskeleton are designed to be compliant with relevant food handling equipment specifications. In embodiments, elastomer seals are used at the interfaces of the exoskeleton joints and deep recesses' are eliminated. In embodiments, the exoskeleton is made of a rigid material such as metal or plastic. In embodiments, the exoskeleton can be completely removed with commonly available tools for cleaning.

In embodiments, a rigid endoskeleton structure is used under the skin to create a geometry that reduces the likelihood of folds forming in the skin.

In embodiments, the skin is oversized. The skin is fabricated so that it's inner dimensions match or are larger than the outer surface of the robot arm. In such embodiments, the flexural strength of the skin material prevents folds in at least one orientation of the robot arm.

In embodiments, the skin is not form-fitting and is instead fabricated with bellows at the joints to allow for a wide range of motion of the robotic arm. The bellows and skin are sized such that there are points in the range of motion of the robot arm where all areas of the bellows are sufficiently extended such that they do not fold over onto themselves and are wipe down compliant. In embodiments, a flexible, compressible layer of material is placed under the skin with bellows to prevent or minimize the bellows from folding back on themselves, thereby aiding in cleaning.

In embodiments, the skin is not form fitting and is sized to be larger than the robot arm. In such embodiments, the skin is not cleaned and is simply replaced.

In embodiments, the skin is comprised of multiple layers including an outer layer of food safe material. Inner layers are fabricated of other materials that serve different functions. For example, in an embodiment, the skin is comprised of at least two layers where the outer layer is a food safe, flexible material and the at least one inner layer is a flexible material serving to prevent the outer layer from forming folds in at least one orientation of the robot arm.

In embodiments, the skin is comprised of an outer surface material of a first thickness and a first modulus that is smooth and generally accepted for food handling applications. The skin further comprises a second inner material that is disposed below the outer surface material. The second inner material has a second larger thickness and a lower modulus than that of the first material. Optionally, in embodiments, the inner material is porous.

In operation, the outer surface material is maintained in a state of tension to prevent folds by sizing it such that the inner material is placed in compression, which applies the necessary force to keep the outer surface material in tension. At rotating joints covered by such a film, strain in the outer surface material as the joint rotates can be mitigated by compression of the inner material, thereby reducing the force applied by the outer surface material to the robotic arm. In embodiments, the thickness of the inner material is greater at joints in order to allow such compression and reduce strain in the outer surface material.

In embodiments, a low friction, stretch material such as a woven lycra is applied under the stretchable skin. In embodiments, such a material reduces folds in the skin. In embodiments, such a material also reduces the strain in the skin associated with a given motion of the robot arm thereby reducing the force applied by the skin to the robotic arm.

In embodiments, this low friction material enables relative motion between the skin and the robotic arm, thereby improving the ability of the skin to remain in tension over a wider range of operating points of the robotic arm. Without intending to being bound by theory, the low friction material and resulting enablement of relative motion between the skin and robotic arm, for a given change in the orientation of a joint of the robot arm, makes available a larger area of the skin to stretch to accommodate the change in position.

Figure 5:
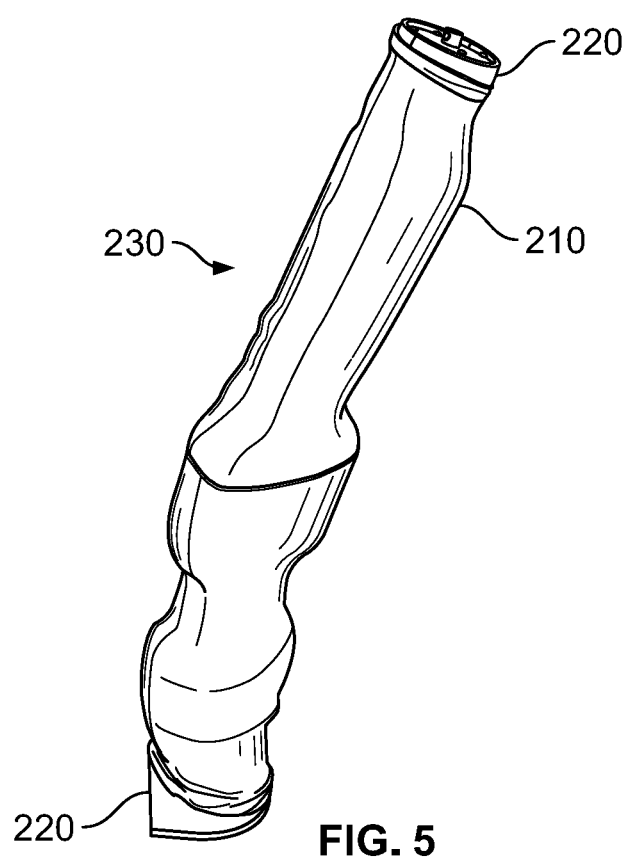
FIG. 5 is a perspective view of another robotic kitchen arm and multi-layered sleeve shown in an extended configuration.

With reference to FIG. 5, an outer, thin, stretchable skin 210 is shown surrounding a thicker, less stretchable, underlayer 220 to create a dual layer structure. In embodiments, the thicker underlayer 220 effectively smoothes the surface features of the robotic arm 230 and enables greater relative motion between the outer layer and the robotic arm. The example structure shown in FIG. 5 is a highly stretchable skin placed over a thicker skin 220 (e.g., neoprene) to prevent folds from forming at the joints and to enable an effective wipe down.

In embodiments, the skin is a disposable cover that is applied to and removed from the arm on a frequent basis. In embodiments, the robotic arm is covered with both a disposable skin and a non-disposable skin.

In embodiments, biocides are impregnated into the outer surface of the skin to reduce the presence of potentially harmful bacteria and other causes of illness. Examples of such biocides include silver nanoparticles, platinum nanoparticles, and other nanostructured materials. In embodiments, the surface of the skin can be heated for similar effect.

In embodiments, a skin assembly comprises a skin and an endcap for the actuator end. For example, the skin can be fabricated with a continuous end cap of the same material with a hole in the center for the end effector. The skin end cap is secured to the robotic arm using an end cap of a rigid material such as steel or aluminum that is attached over a portion of the skin end cap.

In embodiments, the skin has a closure along at least a portion of its length that can be opened. In embodiments, opening the closure renders the skin easier to place over the robotic arm. In embodiments, the closure is comprised of a Ziploc-type seal.

Figure 6:
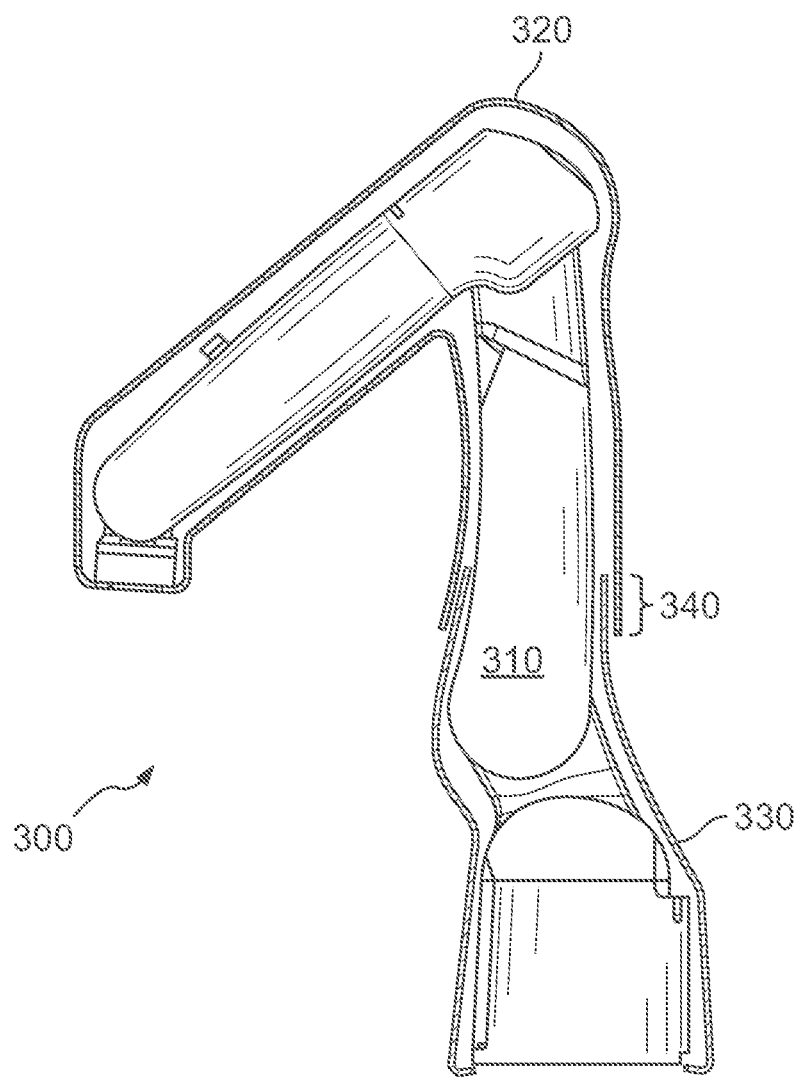
FIG. 6 shows a cross sectional view of another robotic kitchen arm and sleeve comprising overlapping sections.

With reference to FIG. 6, another sleeve 300 is shown covering a robotic arm 310. Sleeve 300 is shown having two separate components 320, 330 to reduce the number of folds formed when the robot is moving. Each sleeve component 320 overlaps the preceding sleeve component 330 similar to a set of tiles. The overlapping sleeves 320, 330 form a closed seam 340 that can freely rotate at each intersection that allows water or any substance to run off the sleeve without seeping into any cracks or crevices. This closed seam 340 is formed by an elastic force in the sleeve 320 around the sleeve 330 underneath. The closed seam may overlap varying amounts, and in embodiments, the overlap ranges from 4 to 8 in. Although the sleeve 300 is shown in FIG. 6 having two sections, embodiments of the invention may include numerous overlapping components. In embodiments, the number of tiles or shingles range from 2-8, and more preferably 3-6. The sleeve components can be made out of the same materials as previously stated and have similar sizes to that described herein.

Many modifications and variations of the present invention are possible in light of the above teachings. It is therefore to be understood that within the scope of the appended claims the invention may be practiced otherwise than as specifically described.

The invention claimed is:

1. A method of cleaning a robotic kitchen arm, the robotic kitchen arm comprising at least one joint and a distal end adapted to couple to an end effector, the method comprising:
providing a sleeve for covering a robotic kitchen arm, the sleeve having a passageway through which the robotic kitchen arm is enclosed, a distal opening through which the end effector extends therethrough, and an exterior surface, and wherein the passageway is sized relative to the robotic kitchen arm such that an effective diameter of the passageway is less than an outer diameter of the robotic kitchen arm;
tautly enclosing the robotic kitchen arm with the sleeve such that the sleeve is stretched, and such that the tautly enclosing step does not interfere with operation of the robotic kitchen arm;
programming the robotic kitchen arm to automatically move to a target configuration in which the sleeve is fold-less along the exterior surface and signal for an employee to clean the exterior surface;
moving the robotic kitchen arm from a first configuration to said target configuration for cleaning while the sleeve tautly encloses the robotic kitchen arm; and
wiping down the exterior surface of the sleeve while the sleeve is enclosing the robotic kitchen arm and in the fold-less target configuration.

2. The method of claim 1, further comprising preparing food using the robotic kitchen arm prior to the step of moving, and wherein the step of preparing food comprises articulating the robotic kitchen arm into at least one bent configuration such that at least one fold arises along a portion of the sleeve.

3. The method of claim 2, wherein the step of moving the robotic kitchen arm is performed by straightening the robotic kitchen arm subsequent to the step of preparing the food until the at least one fold is eliminated.

4. The method of claim 1, wherein the sleeve has a passageway of varying size along the length of the sleeve.

5. The method of claim 4, wherein the robotic kitchen arm comprises a first joint, a second joint spaced from the first joint, and a section intermediate the first joint and the second joint, and wherein the passageway of the sleeve is characterized by a first diameter at the first joint (D1), a second diameter (D2) at the intermediate section between the first joint and the second joint, and a third diameter (D3) at the second joint, and wherein D1 is greater than D2 and D3 is greater than D2.

6. The method of claim 5, wherein a ratio of D1 to D2 ranges from 8/7 to 10/5.

7. The method of claim 6, wherein D2 ranges from 5-7 inches.

8. The method of claim 1, wherein the sleeve was manufactured by stitching, gluing, or molding.

9. The method of claim 1, further comprising clamping the distal end of the sleeve to the robotic arm.

10. The method of claim 1, wherein the sleeve has an elasticity less than 100 kPA.

11. The method of claim 1, wherein the sleeve that is to enclose the robotic kitchen arm has a formfitting outer skin.

12. The method of claim 11, wherein the skin is stretchable.

13. The method of claim 1, wherein the sleeve that is to enclose the robotic kitchen arm has been impregnated with a biocidal agent.

14. The method of claim 1, wherein the robotic kitchen arm is further programmed to move to a second target configuration such that a second portion of the sleeve has no folds, and signaling to clean the second portion of the sleeve.

* * * * *